(12) United States Patent
Williams (10) Patent No.: US 10,276,996 B2
(45) Date of Patent: Apr. 30, 2019

(54) LOCATION TRACKING POWER CORD AND METHOD THEREFORE

(71) Applicant: Kevin Williams, Festus, MO (US)

(72) Inventor: Kevin Williams, Festus, MO (US)

(*) Notice: Subject to any disclaimer, the term of this patent is extended or adjusted under 35 U.S.C. 154(b) by 0 days.

(21) Appl. No.: 15/519,457

(22) PCT Filed: Oct. 14, 2015

(86) PCT No.: PCT/US2015/055546
§ 371 (c)(1),
(2) Date: Apr. 14, 2017

(87) PCT Pub. No.: WO2016/061238
PCT Pub. Date: Apr. 21, 2016

(65) Prior Publication Data
US 2017/0244207 A1    Aug. 24, 2017

Related U.S. Application Data

(63) Continuation-in-part of application No. 14/515,167, filed on Oct. 15, 2014, now Pat. No. 9,426,612.

(51) Int. Cl.
| | |
|---|---|
| *G08B 13/14* | (2006.01) |
| *H01R 31/06* | (2006.01) |
| *H04W 4/02* | (2018.01) |
| *G06Q 10/00* | (2012.01) |
| *H01R 13/66* | (2006.01) |

(52) U.S. Cl.
CPC ............ *H01R 31/065* (2013.01); *H04W 4/02* (2013.01); *G06Q 10/00* (2013.01); *H01R 13/6691* (2013.01)

(58) Field of Classification Search
CPC .................................. H04W 4/00; G06Q 10/00
See application file for complete search history.

(56) References Cited

U.S. PATENT DOCUMENTS

| 5,689,242 A | 11/1997 | Sims et al. |
| 6,007,372 A * | 12/1999 | Wood ...................... G01S 19/13 |
| | | 439/502 |
| 6,892,405 B1 | 5/2005 | Dimitriu et al. |

(Continued)

FOREIGN PATENT DOCUMENTS

| CN | 201233441 | 5/2009 |
| CN | 201369443 | 12/2009 |

(Continued)

OTHER PUBLICATIONS

Transmittal Letter of Related Cases dated Apr. 14, 2017.

(Continued)

*Primary Examiner* — Shirley Lu
(74) *Attorney, Agent, or Firm* — Middleton Reutlinger (57) ABSTRACT

A location tracking power cord and method therefore is taught in the various embodiments. The power cord includes a location module housing having a location circuit board therein. Within the location module housing, a power supply is positioned and in electrical communication with conductors extending through the cord housing. The location module housing also provides location for a communication module including a location module such as a Global Positioning System (GPS) satellite receiver and at least one cellular transceiver. In some embodiments, the power cord may be hospital grade.

21 Claims, 9 Drawing Sheets

(56) References Cited

U.S. PATENT DOCUMENTS

| | | |
|---|---|---|
| 9,426,612 B2 | 8/2016 | Williams |
| 2004/0229633 A1 | 11/2004 | Riday |
| 2007/0015975 A1 | 1/2007 | Faries, Jr. et al. |
| 2007/0179702 A1 | 8/2007 | Pemble et al. |
| 2009/0109033 A1* | 4/2009 | Salvat .................. G01S 5/0027 340/572.1 |
| 2012/0258678 A1 | 10/2012 | van den Elzen |
| 2016/0360359 A1 | 12/2016 | Williams |

FOREIGN PATENT DOCUMENTS

| | | |
|---|---|---|
| CN | 202797557 | 3/2013 |
| JP | 2006245983 | 9/2006 |
| JP | 2012027628 | 2/2012 |
| KR | 1020020024141 | 3/2002 |
| WO | 2013123439 A1 | 8/2013 |
| WO | 2014033605 | 3/2014 |
| WO | 2016061238 | 4/2016 |

OTHER PUBLICATIONS

Korean Intellectual Property Office, International Search Report and Written Opinion for PCT/US2015/055546 dated Jan. 27, 2016, pp. 1-11, Daejeon, Republic of Korea Jan. 27, 2016.
United States Patent and Trademark Office, Non-Final Office Action for U.S. Appl. No. 14/515,167 dated Dec. 15, 2015.
United States Patent and Trademark Office, Non-Final Office Action for U.S. Appl. No. 15/240,734 dated Oct. 11, 2016.

* cited by examiner

LOCATION TRACKING POWER CORD AND METHOD THEREFORE

CROSS-REFERENCES TO RELATED APPLICATIONS

This Non-Provisional Continuation National Stage Application claims priority to and benefit under 35 U.S.C. § 365(b) to PCT Application PCT/US 2015/055546, filed Oct. 14, 2015, titled "Location Tracking Power Cord and Method Therefore" which is a continuation in part application that claims priority to and benefit under 35 U.S.C. 119 to U.S. Non-Provisional Patent Application Ser. No. 14/515,167 filed Oct. 15, 2014 and titled, "Location Tracking Power Cord and Method Therefore", all of which is incorporated by reference herein.

BACKGROUND

Field of the Invention

Present embodiments generally relate to a power cord for medical equipment which is movable to and from various locations. More specifically, present embodiments are related to power cords with integral location tracking hardware installed on or in the cord allowing instantaneous location information for any device the cord is connected to.

Description of the Related Art

The United States Food and Drug Administration (FDA) requires manufacturers or users to track certain medical devices which are utilized in the medical field in order to ensure that they may be promptly located once into commercial distribution. This may facilitate notifications and recalls of medical equipment ordered by the FDA which otherwise may cause serious risk to health if not located promptly. Manufacturers must adopt a method of tracking devices where failure would be reasonably likely to have serious, adverse health consequences or if the device is a life-sustaining or life-supporting device used outside of a device-user facility.

For example, the FDA has issued orders to manufacturers on devices which function as breathing frequency monitors, continuous ventilators, DC-defibrillators and paddles and ventricular bypass (assist) devices. Tracking augments the FDA's authority to order mandatory recalls and require notification of health professionals and patients regarding unreasonable risk of substantial harm associated with a device. Title 21 of the Code of Federal Regulations (CFR) provides further information on tracking requirements which are set forth by the United States Federal Government.

The current method of scanning equipment for purposes of locating or tracking involves scanning of a piece of equipment then subsequently moving the equipment to a location where it is intended to be used. However, in some circumstances, equipment may be moved without being scanned so that it ends up in an alternate location than recorded by the scanning process. Further, it is also somewhat time-consuming to require manual scanning of each piece of equipment each time the equipment scans into a storage area or scans out for movement to a location for use.

Further, once scanned, the hospital or health care provider staff, for example, may be required to go to a separate database to look up the location where the equipment is supposed to be located although such listing or recordation may not be accurate. Accordingly, there is a need to overcome these and other deficiencies while meeting at least the desired goals described above, including, but not limited to, improved scanning of equipment and ability to locate the equipment.

The information included in this Background section of the specification, including any references cited herein and any description or discussion thereof, is included for technical reference purposes only and is not to be regarded subject matter by which the scope of the invention is to be bound.

SUMMARY

A location tracking power cord and method therefore is taught in the various embodiments. The power cord may be of hospital grade, and may have a first end plug and a second end plug with a cord extending therebetween. The cord includes a housing and multiple conductors extending with the housing between the first plug end and the second plug end. Also located along the power cord and between the first and second ends is a location module housing having a location circuit board therein. Within the GPS module housing, a power supply is positioned and in electrical communication with conductors extending through the cord housing. The location module housing also provides location for a communication module including a location module such as a Global Positioning System (GPS) satellite receiver and at least one cellular transceiver. A method is also provided wherein the location power cord is connected to a medical device and receives a satellite locating signal. The communication module transmits location information to a location server and the location server may be accessed to display location of a medical device to which the power cord is connected.

According to some embodiments, a location trackable power cord comprises a hospital grade power cord including a sheath and a plurality of conductors therein, the hospital grade power cord having a first end and a second end and a location module housing therebetween, the plurality of conductors extending between plugs at the first and the second end, a circuit board, a location tracking module, a power supply and a battery also disposed within the location tracking module housing, and the plurality of conductors in electrical communication with the battery and the location tracking module.

Optionally, one of the first end and the second end may be a 120V AC input and the other of the first end and the second end being 120V AC output. The plurality of conductors may be three conductors. The location tracking module may utilize at least one of triangulation or trilateration to determine position. The location trackable power cord may further comprise a power supply that includes an AC to DC transformer. The transformer may be in electrical communication with the battery. The battery may be a rechargeable battery and further the battery may be a lithium ion battery. The plug at the first male end may have three prongs and the plug at the second female end may have three apertures. The location trackable power cord wherein the location tracking module may further comprise a GPS satellite receiver. The location trackable power cord may further comprise a digital cellular transceiver or an analog cellular transceiver. The location trackable power cord may further comprise a wireless communication module. The wireless communication module may be a Wi-Fi communication module. One of said plugs being one of straight or right angle type.

According to an alternate embodiment, a system for tracking a medical device comprises a hospital grade power cord having a first male plug at a first end and a second female plug at a second end, the cord may be connectable to a power source and a medical device at the ends. A housing may be disposed between the first plug end and the second plug end, the housing may have a global positioning system ("GPS") circuit board therein, a power supply may be located in the housing in electrical communication with conductors extending between the first and second plug ends of the power cord. The power supply may be connected to the GPS circuit board and to a battery charging circuit. A communication module may be in communication with the GPS circuit board including a GPS satellite receiver and at least one of a cellular transceiver. A GPS server may be in communication with the power cord and accessible by computer to determine location of the medical device.

According to still a further embodiment, a method of tracking location of a medical device comprises connecting a GPS power cord to a medical device to be tracked, receiving one or more satellite signals at a GPS module of the GPS power cord, determining, by the GPS module, a location of the GPS power cord based on the one or more satellite signals, and transmitting location information to a GPS location server. The method may further comprise accessing the GPS location server to determine a position of the medical device based on the location of the GPS power cord.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. A more extensive presentation of features, details, utilities, and advantages of the present invention is provided in the following written description of various embodiments of the invention, illustrated in the accompanying drawings, and defined in the appended claims.

BRIEF DESCRIPTION OF THE DRAWINGS

In order that the embodiments may be better understood, embodiments of the location power cord and related system for use will now be described by way of examples. These embodiments are not to limit the scope of the claims as other embodiments of the assembly will become apparent to one having ordinary skill in the art upon reading the instant description. Non-limiting examples of the present embodiments are shown in figures wherein:

DETAILED DESCRIPTION

It is to be understood that the location power cord and related system for use is not limited in its application to the details of construction and the arrangement of components set forth in the following description or illustrated in the drawings. The embodiments are capable of other embodiments and of being practiced or of being carried out in various ways. For example, one embodiment is capable of being combined with a second embodiment to create a further embodiment. Also, it is to be understood that the phraseology and terminology used herein is for the purpose of description and should not be regarded as limiting. The use of "including," "comprising," or "having" and variations thereof herein is meant to encompass the items listed thereafter and equivalents thereof as well as additional items. Unless limited otherwise, the terms "connected," "coupled," and "mounted," and variations thereof herein are used broadly and encompass direct and indirect connections, couplings, and mountings. In addition, the terms "connected" and "coupled" and variations thereof are not restricted to physical or mechanical connections or couplings.

Referring now in detail to the drawings, wherein like numerals indicate like elements throughout several views, there are shown in FIGS. 1-9, various embodiments of a location power cord, system and method for use thereof. The location power cord includes a power cord including a sheath having a plurality of conductors extending therethrough between a first end where a first plug is located and a second end where a second plug is located. Located along the power cord sheath is a location module housing wherein a battery and location module are located. Additionally, a power supply and communication module may be located therein as well. The location power cord may be connected to a medical device and a power source and may determine its location using various techniques. By way of the communication module, the location power cord may then communicate to a location server so that when accessed, the location server can provide real time information and location of the medical device to which the location power cord is connected.

Figure 1:
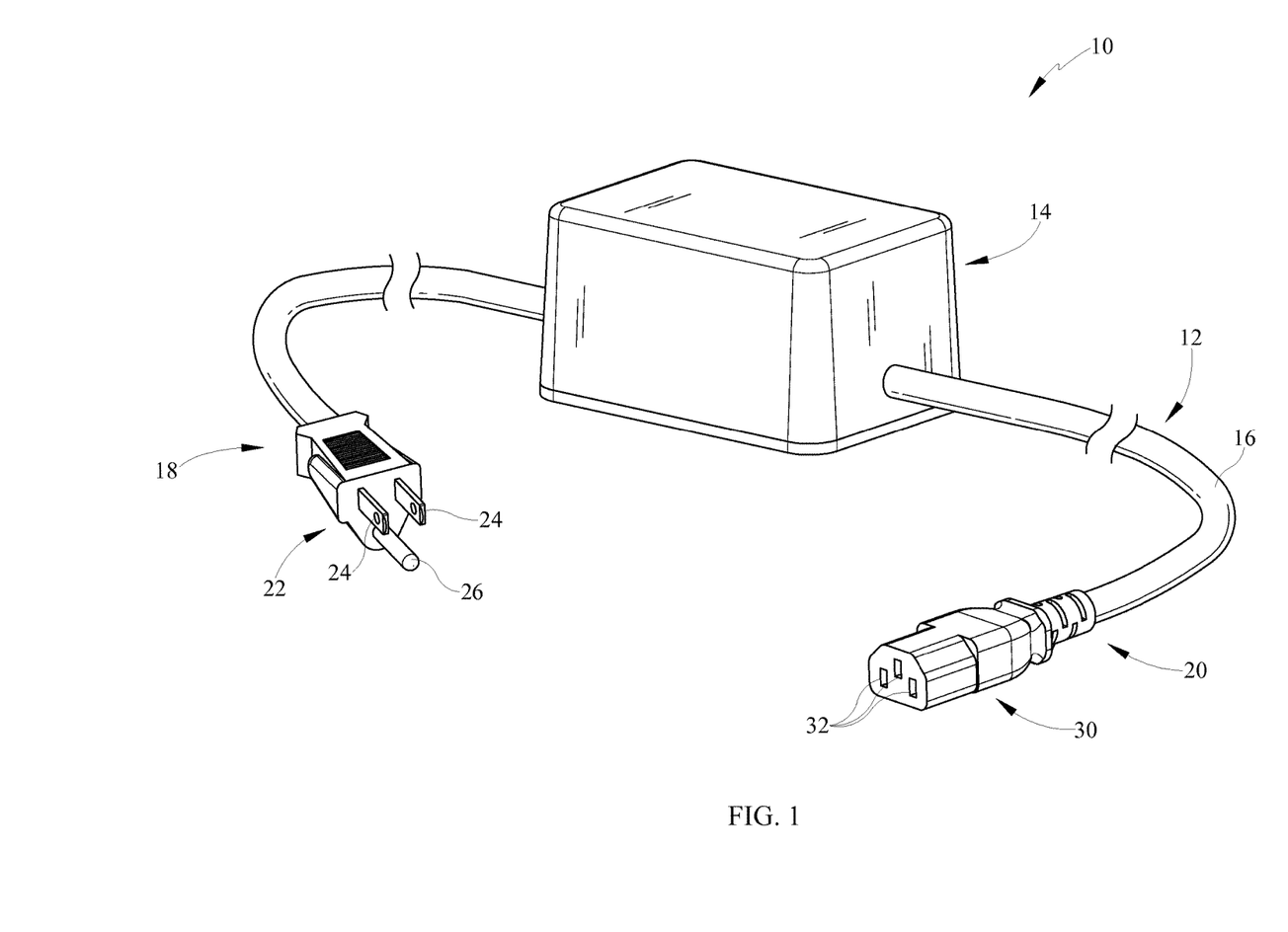
FIG. 1 is a perspective view of an exemplary embodiment of the location power cord capable of being utilized with a plurality of various medical devices.

Referring now to FIG. 1, an exemplary location power cord 10 is shown in perspective view. The location power cord 10 includes a power cord 12 and a location module housing 14 located between ends of the power cord 12.

The power cord 12 includes a cord sheath 16 through which a plurality of conductors 46, 47, 48 (FIG. 2) extend. The cord sheath 16 may be formed of, for non-limiting example, a flexible plastic material which forms a sheath over the conductors. The power cord 12 includes a first end 18 and a second end 20. At the first end 18 of the power cord 12 is a first plug 22. The first plug 22 of the exemplary embodiment is a male plug having a plurality of blades 24 and a ground plug 26. At a second end 20 of the power cord 12 is a second plug 30. In the depicted embodiment, the second plug 30 is a female plug having three blade apertures 32. The first plug 22 and second plug 30 may be either male or female. The first plug 22 may be connected to a power source such as a 120V AC source which is standard in homes and commercial complexes. The second plug 30 may be connected to a medical device (not shown) which is required to be tracked according to FDA guidelines set forth in the Code of Federal Regulations. The plugs 22, 30 may be molded on plug attachments of the non-locking type configuration. These may be rated, for example, at 15 or 10 amps and 125 or 250V usage. The plugs 22, 30 may be of the straight type as depicted, that the longitudinal axis of the flexible cord is parallel to that of the line blades, or may be of the right angle or left angle type wherein the longitudinal axis of the flexible cord 12 is at a right angle to that of the line blades and blade apertures 24, 32 and again may be molded to the power cord sheath 16. In some instances, plugs 22, 30 and/or flexible cord 12 may be constructed in this manner in order to comply with requirements set forth in the UL Standards, Section 817 described as "hospital grade".

Figure 2:
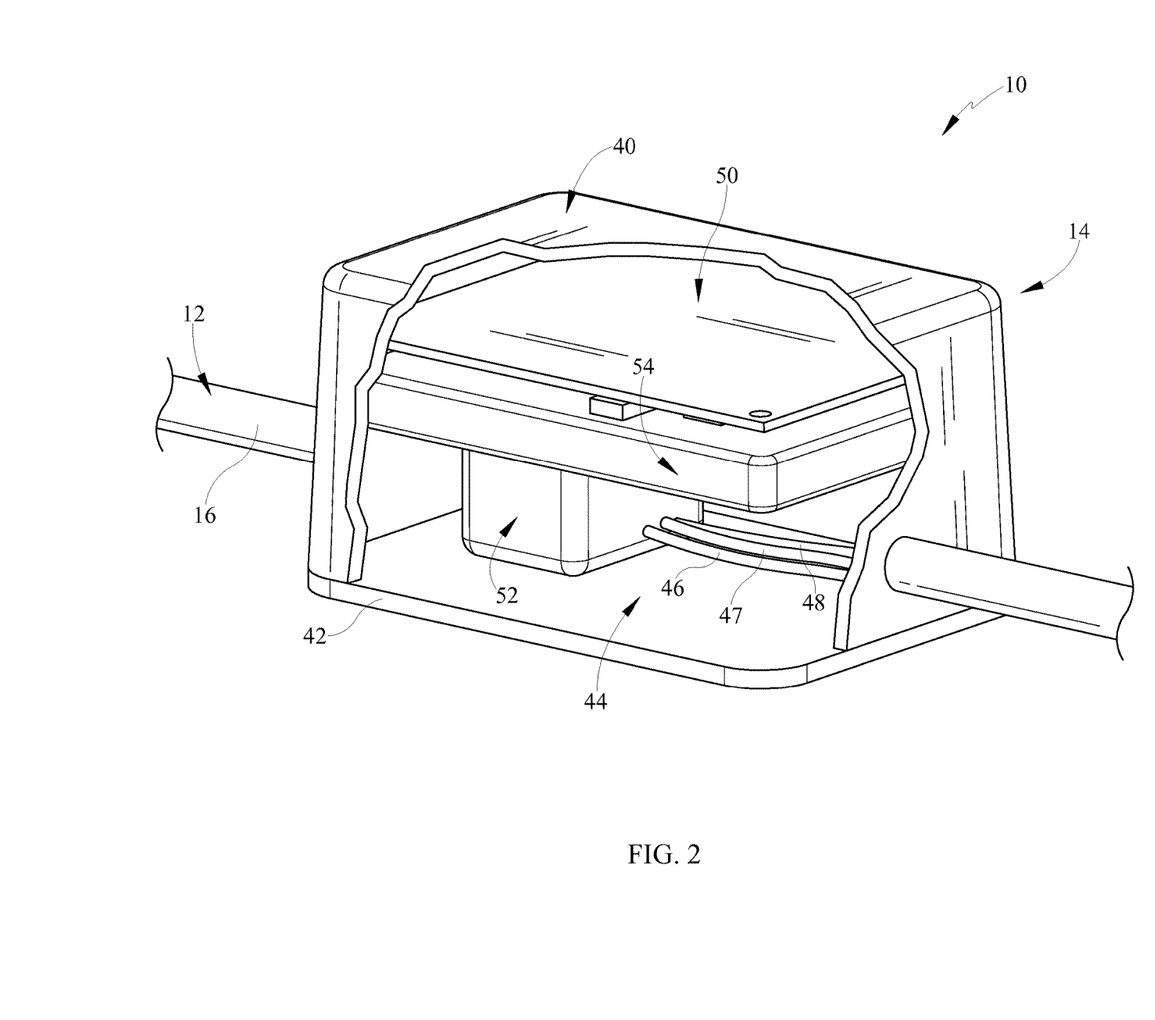
FIG. 2 is a perspective view with a portion of a location module housing located between the first and second ends of the power cord housing.

Referring now to FIG. 2, the location module housing 14 is shown in a perspective view with a portion of the location module housing 14 cut away to reveal interior components of the assembly of components located therein. In the depicted embodiment, the power cord 12 is in electrical communication with the location module housing 14 and conductors within the cord sheath 16 extend into the module housing 14 and are in electrical communication with the various components located therein.

The depicted embodiment includes the housing cover 40 and a base 42 which form a hollow compartment 44 wherein various components are located. Within the compartment 44 are a printed circuit board 50, a transformer 52 and a battery 54. One or more of these components may or may not be present in other embodiments. For example, in some embodiments, no battery is present, and power is obtained exclusively from the plurality of conductors 46, 47, 48.

The printed circuit board 50 provides communication with a cellular phone system and/or one or more satellites in order to provide location information to the system within which the location power cord 10 is utilized. Therefore, the printed circuit board 50 defines, at least in part, a location communication module as well as a mobile or cellular communication module. The transformer 52 receives power from conductors 46, 47, 48. The transformer 52 converts the higher voltage AC electricity to a lower voltage DC electricity suitable for use in charging the battery 54 and powering the printed circuit board 50.

Figure 3:
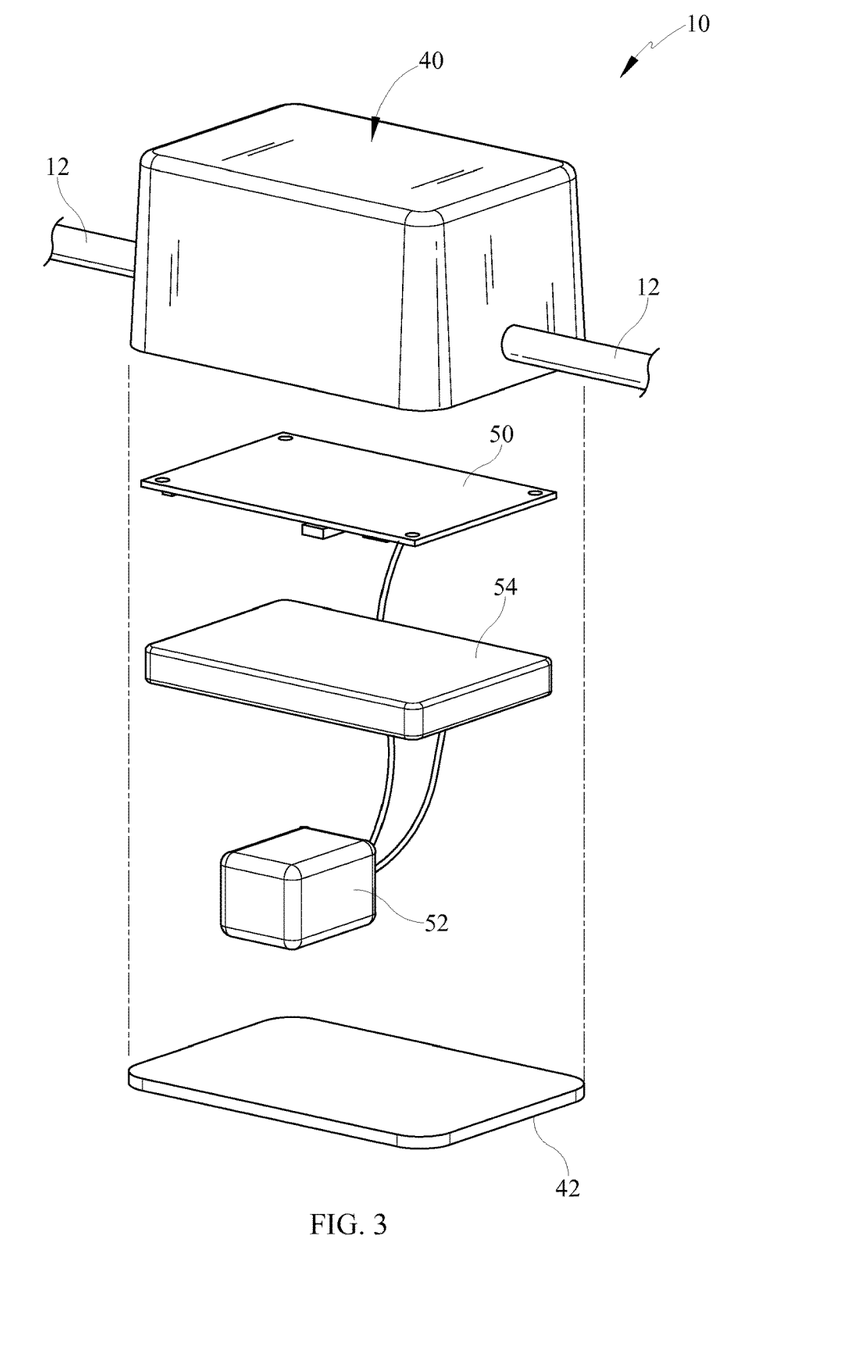
FIG. 3 is an exploded perspective view of the components within the location module housing.

Referring now to FIG. 3, the housing cover 40 is exploded from the base 42 and the various components are exploded apart as well. The conductors 46, 47, 48 (FIG. 2) are not shown simply for sake of clarity. However, one skilled in the art should understand that the conductors utilized within the power cord 12 provide power to the transformer 52 which powers the battery charging and the printed circuit board 50.

The housing 40 and base 42 may be formed of a thermoformed plastic or other molded material such that the housing cover 40 may be adhered to or fastened to the base 42. The housing 40 and cord sheath 16 may also be formed of like materials to aid in joining the two parts, or may be of different materials.

Disposed above the base 42 is a transformer 52 which is connected to the conductors 46, 47, 48 (FIG. 2). The transformer 52 is supplied with either 120V or 240V AC electricity, for example at 50 or 60 hz input. The transformer 52 converts the higher voltage AC input to a lower voltage DC output. For example, the output voltage may range from 1.5V to 12V and according to one embodiment may be 5V DC which is suitable for charging the battery 54 and operating the circuitry on the printed circuit board 50.

Above the transformer 52 is a battery 54. The battery 54 may be a lithium ion battery which is rechargeable by way of connection and power supplied from the transformer 52.

The battery 54 may be directly connected to the printed circuit board 50 or alternatively, may be directly connected to the transformer 52. The lithium ion battery is desirable for its ability to recharge multiple occasions without developing battery memory and reducing life and capacity of the battery. However, the battery 54 does not necessarily have to be lithium ion as other types may be used, for example nickel cadmium batteries are also rechargeable and may be utilized. The exemplary battery 54 may be a 1,100 milliamp hour battery or a 4.7 watt-hour battery. Additionally, a larger battery may be utilized if desirable for longer operational time when the soul power source is the battery 54.

Above the battery 54 is the printed circuit board 50. The printed circuit board 50 provides various functions for the location power cord 10. First, the printed circuit board 50 provides communication with one or more components that may be used to obtain a location of power cord 10, so that the printed circuit board 50 may locate the location power cord 10 to a specific location, e.g., on Earth and/or relative to some known location. These location-obtaining components may form part of indoor or outdoor position systems, and may include but are not limited to one or more GPS satellites, one or more cellular towers (e.g., using triangulation), one or more Wi-Fi access points (also referred to as Wi-Fi-based positioning system, or "WPS"), Internet Protocol positioning system components, magnetic positioning components, and so forth. Additionally or alternatively, in some embodiments, one or more inertial measurement components contained within location module housing 14 may be used to determine location.

Figure 5:
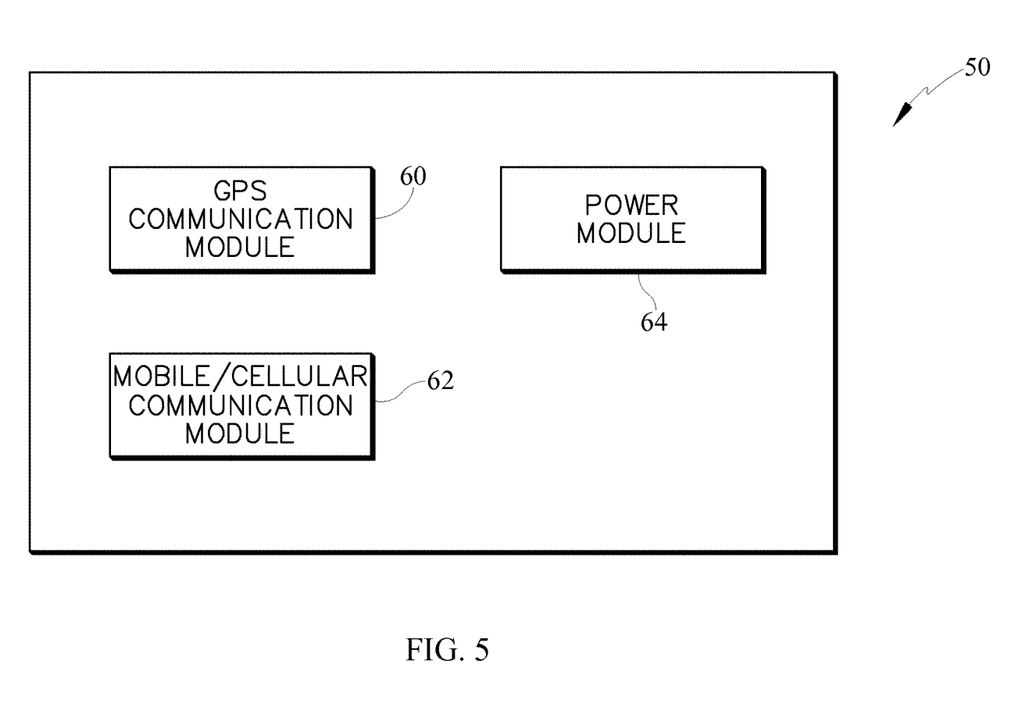
FIG. 5 is a schematic view of a printed circuit board with various modules for providing communication.

Additionally, the printed circuit board 50 may also provide cellular communication with a cellular data service 300 (FIG. 6) so that locational information may be transmitted to one or more servers 200 (FIG. 6) by way of the internet 400 (FIG. 5). This server 200 allows for data base registry of the location of the location power cord 10. In order to accomplish this cellular data service 300 connection, the printed circuit board 50 may include a SIM card receptacle. Additionally, the printed circuit board 50 may include a reset button which may temporarily de-power the operating system and cause the on-board programming to reboot. Further, a USB port or other micro-USB port may be utilized to program a central processor on the printed circuit board 50. The processor may provide for the location communication functionality and the cellular/data communication functionality. The location communication may be programmed to perform at various intervals. When the interval is set to a higher rate, the battery 54 may die sooner while oppositely, if the interval is set at a lower rate, the battery 54 may last longer. According to some embodiments, the interval for location communication may be set from between about once every second to about once every hour.

The printed circuit board 50 may also comprise one or more antennas for use in receiving various signals, such as a GPS signal from one or more GPS satellites orbiting the earth, the cellular data communication to send the location to a server and to additionally receive data from cellular antennas which may be used additionally to triangulate for purpose of locating the location power cord 10.

Figure 4:
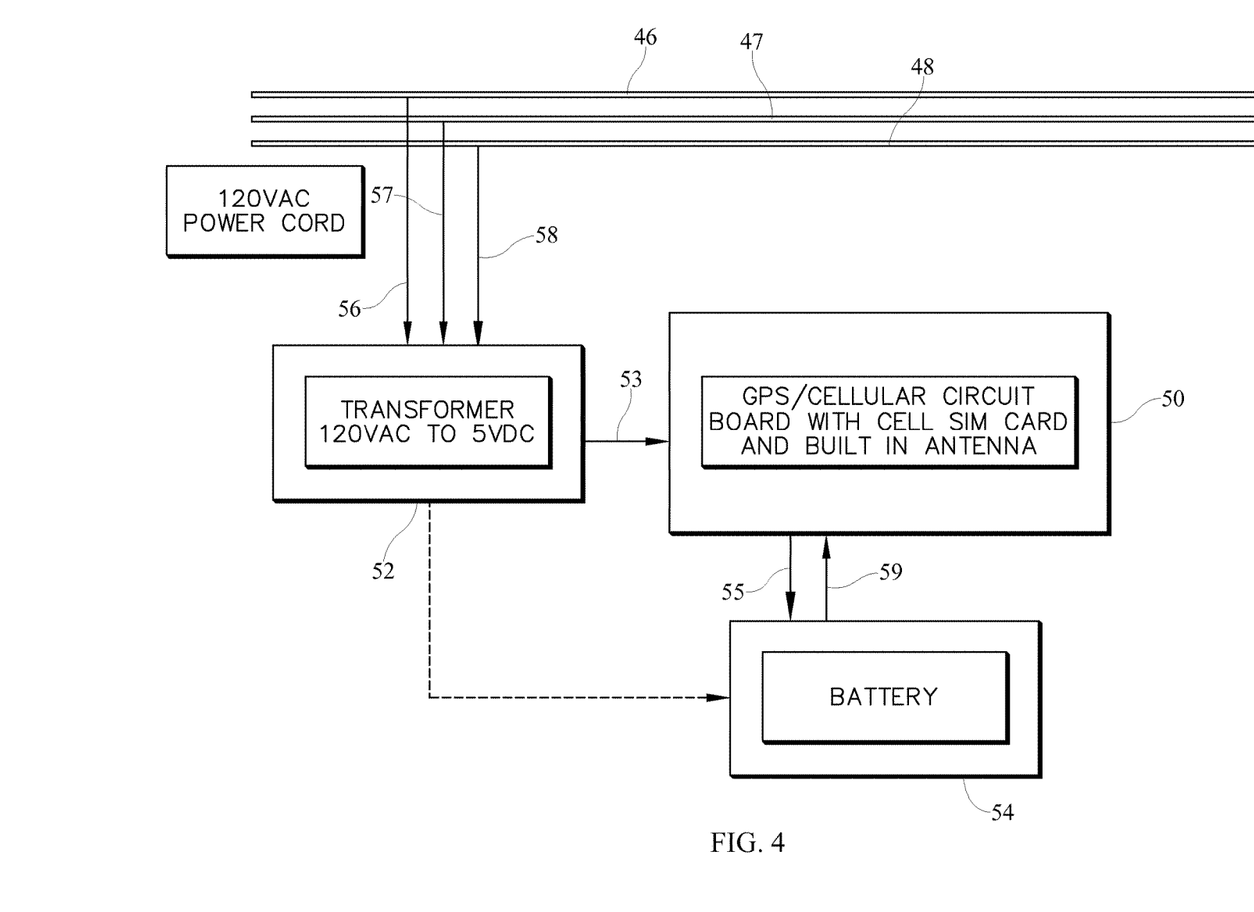
FIG. 4 is a schematic drawing of the conductors within the power cord and connection to the electrical components located within the location module housing.

Referring additionally now to FIG. 4, a schematic depiction of the wiring for power is depicted. The conductors 46, 47, 48 which are located within the power cord 12 are shown extending through the compartment 44 of the housing cover 40 and base 42 (FIG. 2). The conductors 46, 47, 48 may represent positive, negative and ground connections for example. The conductors 46, 47, 48 are connected to the transformer 52 by transformer leads 56, 57, 58 in order to provide input power to the transformer 52. As previously discussed, the transformer 52 converts the 120V AC input to a 5V DC output. The transformer 52 is in electrical communication with the printed circuit board 50 as indicated by arrow 53. The circuit board 50 is also in electrical communication with battery 54 to provide a communication channel between the transformer 52 and the battery 54. In the depicted embodiment, the circuit board 50 includes two arrows 55, 59 extending between the circuit board 50 and the battery 54. These connections provide power to the battery 54 for charging and power from the battery to the board 50 for powering the location power cord 10 when the location power cord 10 is not connected to a power source. Additionally, a broken line 51 is depicted and represents an alternative embodiment wherein the transformer 52 is directly connected to the battery 54 for charging purpose. This might be, for example, used in combination with the connection at arrows 55, 59 between the battery 54 and circuit board 50.

Referring now to FIG. 5, a schematic view of the printed circuit board 50 is shown. The printed circuit board 50 comprises a location communication module 60 which may comprise the one or more antennas for communicating with, e.g., various GPS satellites, cellular towers, Wi-Fi access points, and so forth.

The printed circuit board 50 further comprises a mobile/cellular communication module 62. The module 62 may comprise 3G, 4G, LTE, CDMA, GSM, TDMA and satellite communication means. This list is not exhaustive however, and other forms of cellular/mobile communication may be utilized.

Further, a power module 64 may be utilized to direct power from the transformer 52 or from the battery 54 (FIG. 4) to the location communication module 60 and the mobile/cellular communication module 62.

Figure 6:
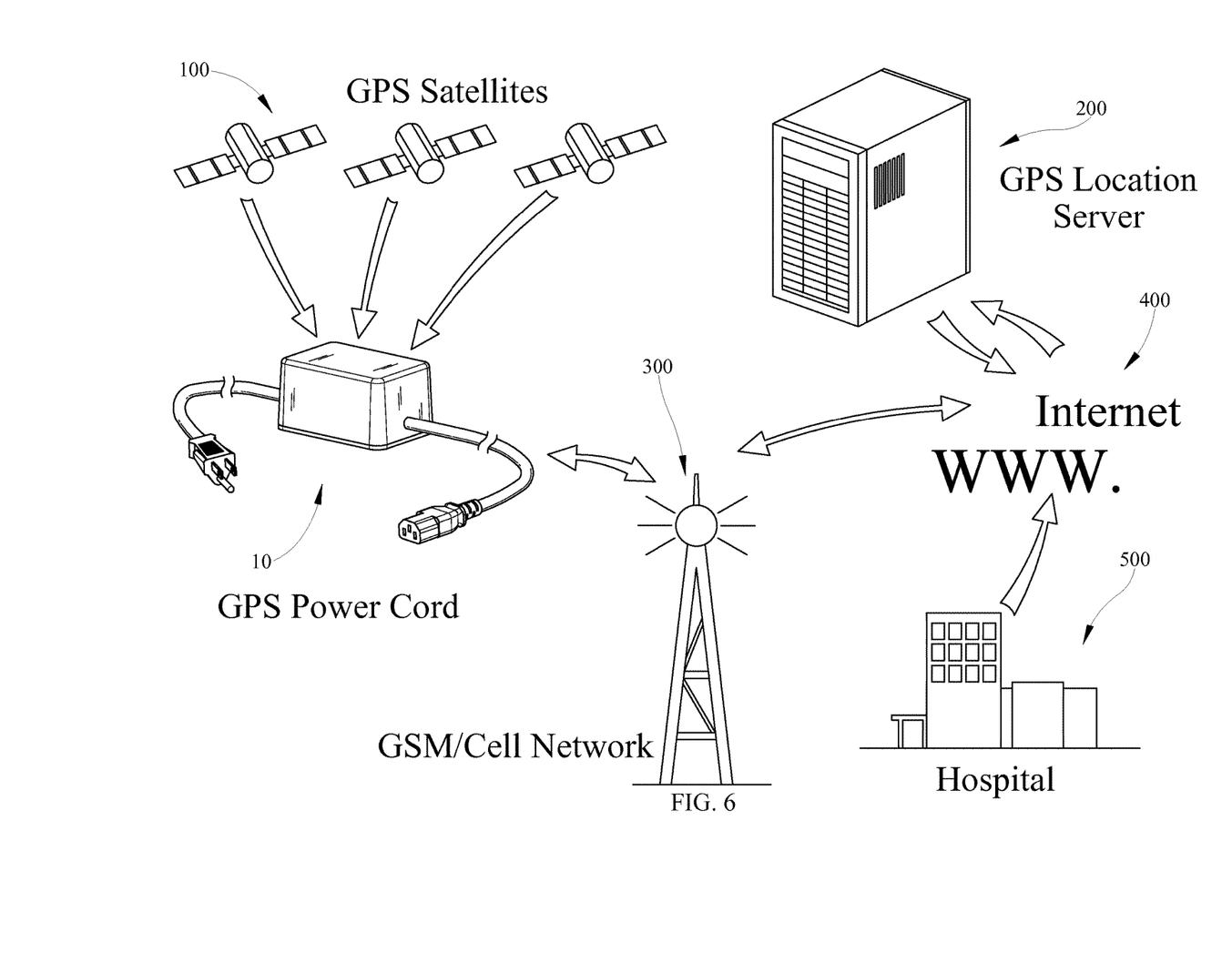
FIG. 6 is a schematic view of the system utilized with the location power cord for communication and location of medical equipment.

Referring now to FIG. 6, an example system is depicted for use with the location power cord 10, in accordance with some embodiments. The printed circuit board 50 (FIG. 3) includes two forms of communication. In one form, the location power cord 10 receives a signal from one or more GPS satellites 100. In a second form of communication, the location power cord 10 communicates with a mobile phone network 300. With regard to the first form of communication, the higher the number of satellite signals received by the location power cord 10, the greater the level of accuracy of at least one locating feature for the location power cord 10. The system further comprises a mobile phone network 300, the location server 200, an internet connection or access 400 for communication and a location 500 where the location server 200 may be accessed from, for example a hospital 500. While a single server 200 is shown in the exemplary embodiment, it should be clear that the server 200 may be two or more servers wherein at least one of the two servers is a backup server. Additionally, the at least one server 200 may be a cloud based server.

In embodiments that employ GPS technology, the GPS technology may work to use radio signals sent by satellites 100 in space. The satellites 100 orbit the earth in cyclical patterns and at any given time, a plurality of satellite signals (e.g., four or more) may be accessible to any point on the surface of the earth. When a receiver device, such as the location power cord 10, is activated, radio waves are sent out and the satellite 100 may track the device. The location power cord's 10 exact location is determined through a process called triangulation or an alternate version called trilateration where three satellites work together to narrow down possible location points while a fourth satellite compiles data and decides on a match. Distance calculations are made based on how long it takes the radio signals to travel back and forth between the receiver of the location power cord 10 and the satellite 100. In order for GPS to work properly, there should be a clear line of sight between the receiver on the printed circuit board 50 and the sky. As this may not be the case, assisted GPS improves upon the standard GPS technology to utilize a cellular network's assistance server which is connected to a reference network. Through the use of cell towers, the location power cord 10 relays satellite information to a server 200 by way of internet 400. In the depicted embodiment, the cellular network tower 300 is shown in communication with the internet 400. The cellular tower 300 receives GPS information received from the GPS satellites 100 at the location power cord 10 and transmits the data to the server 200 by way of internet 400. The assisted GPS technology allows the cellular network server 200 to receive the data and process incoming data at a higher rate than GPS receivers so information is transmitted faster and is typically more accurate than what a GPS receiver can relay on its own.

A hospital 500 is shown in the embodiment as well. The exemplary hospital 500 may communicate by way of the internet to access information at the location server 200 and quickly acquire database information on the location power cord 10. Thus, the location of the location power cord 10 and associated device may be found quickly by way of, for example, a web-based application.

In this embodiment, the location power cord 10 may further have model and serial number of an associated piece of equipment programmed into the printed circuit board 50, for example on firmware or on a memory chip associated with the printed circuit board 50. This will be added to a user account, for example, an owner of a device or manufacturer and all data from the associated location power cord 10 will be captured and logged into the tracking software which is either located on the user's computer, for example at the hospital 500 or alternatively, on the location server 200. Thus, when a user logs into the software or application, the user can access in real-time location of the location power cord 10 and the associated medical device from the server 200. Further, it may be that when a user at a hospital or other facility logs into the tracking software, all devices associated with this user may be seen so that a specific medical device may then be selected from the group of devices for further locational information. Still further, the at least one user or an alternative person at a different location may further be able to utilize a mast log-in account to modify information related to any medical device and any location power cord 10.

Figure 7:
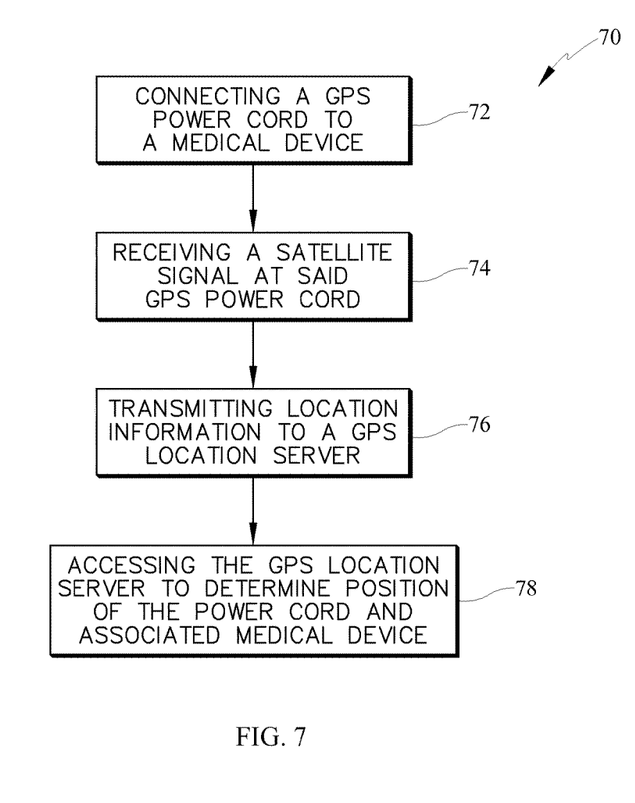
FIG. 7 is a flow chart describing the method of use of the location power cord and related system.

Referring now to FIG. 7, a method of use of the location power cord 10 is described. First, the location power cord is connected to a medical device 72 and powered up from a power source or battery 54. Next, the location module receives a satellite signal at step 74. The printed circuit board 50 may determine location or coordinates which are subsequently sent to a server at step 76. Finally, the server may be accessed via the internet in order to determine the location of the location power cord 10 and associated medical device 72 at step 78. Further, the user who logs in to check the location of a medical device and associated location power cord 10 may further be able to run history reports to show locations where the location power cord and medical device have been through some preselected historical time period, in addition to the real time location. The tracking software may additionally have geo-fence capability for which alarm conditions may be enabled to provide an alarm if a location power cord 10 and corresponding medical device are moved to a location other than where the location power cord 10 is supposed to be. Still further alternative alarms may be utilized and enabled, for example but not limited to, low battery condition of the power cord 10. Still further, emails or SMS messages may be sent from the server 200 to notify a responsible person that alarm conditions have been triggered, for example. These may alarms and email/messaging services may be selectively set for different conditions and whether or not to send since notifications of alarm conditions may be suitable in some situations but not others.

Figure 8:
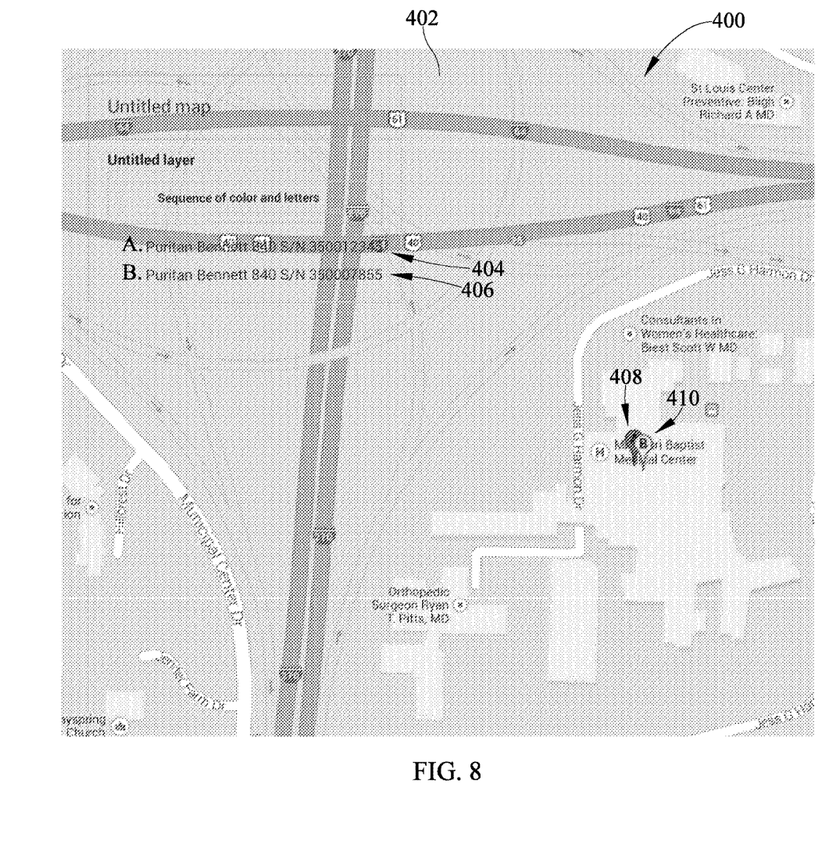
FIG. 8 is an exemplary screen shot of a tracking software or application.

Referring now to FIG. 8, an exemplary screen shot of a tracking software or application is depicted as seen by a user logging into the location server 200 (FIG. 5). In the exemplary embodiment, the tracking software may utilize a mapping application 402 on the internet 400, for example GOOGLE maps to display a location of the power cord 10 and associated medical device. The GPS location server 200 may provide a determined geo-positional signal to either the mapping application 402 which may be an internet based application or an application installed on a locale computer where the lookup for the medical device is occurring.

Once the application 402 is started, identifying information for the power cord 10 may be provided by a serial number for either the cord or the medical device. Further, the mapping application 402 may convert the geo-positional signal to a locational image on the application 402. In the depicted embodiment, at least one geo-positional signal is in a standard as devices 404, 406. The standard depicts serial numbers corresponding to devices 404, 406. Additionally, the mapping application 402 depicts markers 408, 410. Thus a user at the local computer, for example at a hospital or medical device sales/rental facility may use the standard information 404, 406 to correspond to markers 408, 410 and determine a location of a medical device and power cord 10 and any associated alarm conditions.

Figure 9:
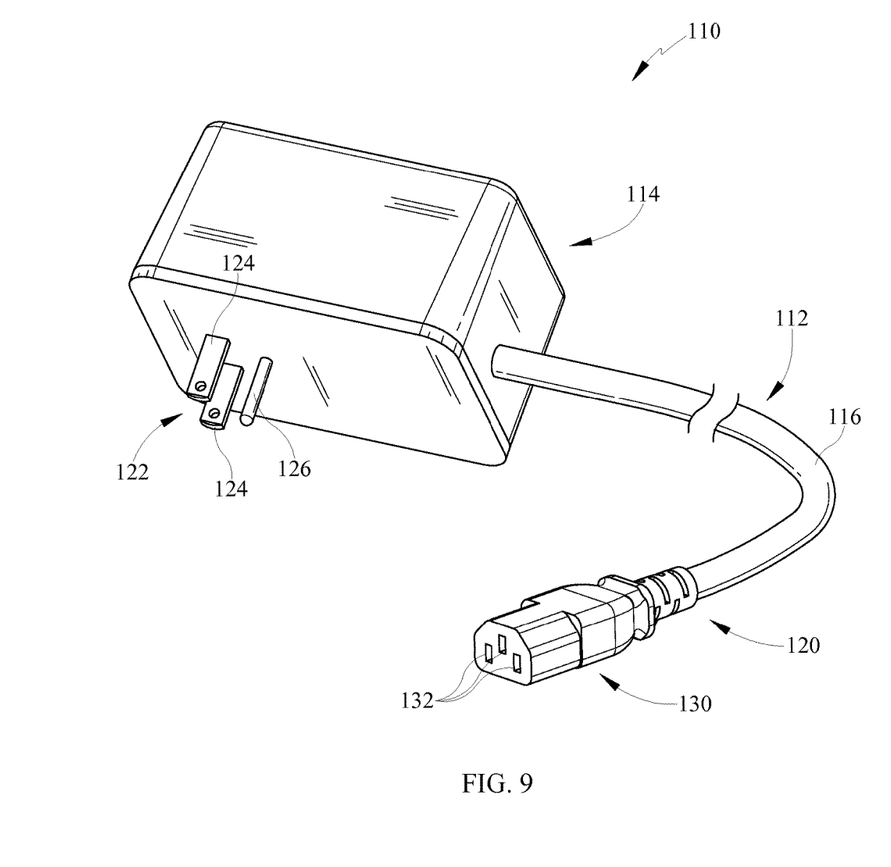
FIG. 9 is a perspective view of a further exemplary embodiment of a location power cord capable of being utilized with a plurality of various medical devices.

Referring now to FIG. 9, a perspective view of an alternate embodiment of a location power cord 110 is provided. The instant embodiment comprises a cord 112 which extends from a module housing 114. In various embodiments, the cord 112 may include a sheath 116 and a plurality of conductors therein. In some embodiments, the cord 112 is a hospital grade cord, although this is not required in every embodiment. At one end, the cord 112 extends from the module housing 114. At a second end 120, the cord 112 include a plug 130 with a plurality of blade apertures 32. The blade apertures 32 receive blades from the medical device.

At the first end of the cord 112 is the module housing 114. Within the module housing 114 are the components related to the GPS tracking as previously described. The instant embodiment includes a plug 122 embodied by a plurality of blades 124 and the ground plug 126 extend from the module housing 114. The blades 124 and the ground plug 126 extend from the housing 114 and therefore the housing 114 is still considered to be located between the plugs 122 and 130. The configuration of the blades 124 and ground plug 126 on the housing 114 provide that the location housing module 114 may function as a wall plug or otherwise sometimes referred to as a "wall-wart." Still further, one skilled in the art will realize that the plugs and apertures of the embodiments may be reversed depending on the configuration of the medical device.

While several inventive embodiments have been described and illustrated herein, those of ordinary skill in the art will readily envision a variety of other means and/or structures for performing the function and/or obtaining the results and/or one or more of the advantages described herein, and each of such variations and/or modifications is deemed to be within the scope of the invent of embodiments described herein. More generally, those skilled in the art will readily appreciate that all parameters, dimensions, materials, and configurations described herein are meant to be exemplary and that the actual parameters, dimensions, materials, and/or configurations will depend upon the specific application or applications for which the inventive teachings is/are used. Those skilled in the art will recognize, or be able to ascertain using no more than routine experimentation, many equivalents to the specific inventive embodiments described herein. It is, therefore, to be understood that the foregoing embodiments are presented by way of example only and that, within the scope of the appended claims and equivalents thereto, inventive embodiments may be practiced otherwise than as specifically described and claimed. Inventive embodiments of the present disclosure are directed to each individual feature, system, article, material, kit, and/or method described herein. In addition, any combination of two or more such features, systems, articles, materials, kits, and/or methods, if such features, systems, articles, materials, kits, and/or methods are not mutually inconsistent, is included within the inventive scope of the present disclosure.

All definitions, as defined and used herein, should be understood to control over dictionary definitions, definitions in documents incorporated by reference, and/or ordinary meanings of the defined terms. The indefinite articles "a" and "an," as used herein in the specification and in the claims, unless clearly indicated to the contrary, should be understood to mean "at least one." The phrase "and/or," as used herein in the specification and in the claims, should be understood to mean "either or both" of the elements so conjoined, i.e., elements that are conjunctively present in some cases and disjunctively present in other cases.

Multiple elements listed with "and/or" should be construed in the same fashion, i.e., "one or more" of the elements so conjoined. Other elements may optionally be present other than the elements specifically identified by the "and/or" clause, whether related or unrelated to those elements specifically identified. Thus, as a non-limiting example, a reference to "A and/or B", when used in conjunction with open-ended language such as "comprising" can refer, in one embodiment, to A only (optionally including elements other than B); in another embodiment, to B only (optionally including elements other than A); in yet another embodiment, to both A and B (optionally including other elements); etc.

As used herein in the specification and in the claims, "or" should be understood to have the same meaning as "and/or" as defined above. For example, when separating items in a list, "or" or "and/or" shall be interpreted as being inclusive, i.e., the inclusion of at least one, but also including more than one, of a number or list of elements, and, optionally, additional unlisted items. Only terms clearly indicated to the contrary, such as "only one of" or "exactly one of," or, when used in the claims, "consisting of," will refer to the inclusion of exactly one element of a number or list of elements. In general, the term "or" as used herein shall only be interpreted as indicating exclusive alternatives (i.e. "one or the other but not both") when preceded by terms of exclusivity, such as "either," "one of," "only one of," or "exactly one of." "Consisting essentially of," when used in the claims, shall have its ordinary meaning as used in the field of patent law.

As used herein in the specification and in the claims, the phrase "at least one," in reference to a list of one or more elements, should be understood to mean at least one element selected from any one or more of the elements in the list of elements, but not necessarily including at least one of each and every element specifically listed within the list of elements and not excluding any combinations of elements in the list of elements. This definition also allows that elements may optionally be present other than the elements specifically identified within the list of elements to which the phrase "at least one" refers, whether related or unrelated to those elements specifically identified. Thus, as a non-limiting example, "at least one of A and B" (or, equivalently, "at least one of A or B," or, equivalently "at least one of A and/or B") can refer, in one embodiment, to at least one, optionally including more than one, A, with no B present (and optionally including elements other than B); in another embodiment, to at least one, optionally including more than one, B, with no A present (and optionally including elements other than A); in yet another embodiment, to at least one, optionally including more than one, A, and at least one, optionally including more than one, B (and optionally including other elements); etc.

It should also be understood that, unless clearly indicated to the contrary, in any methods claimed herein that include more than one step or act, the order of the steps or acts of the method is not necessarily limited to the order in which the steps or acts of the method are recited.

In the claims, as well as in the specification above, all transitional phrases such as "comprising," "including," "carrying," "having," "containing," "involving," "holding," "composed of," and the like are to be understood to be open-ended, i.e., to mean including but not limited to. Only the transitional phrases "consisting of" and "consisting essentially of" shall be closed or semi-closed transitional phrases, respectively, as set forth in the United States Patent Office Manual of Patent Examining Procedures, Section 2111.03.

The foregoing description of several methods and an embodiment of the invention has been presented for purposes of illustration. It is not intended to be exhaustive or to limit the invention to the precise steps and/or forms disclosed, and obviously many modifications and variations are possible in light of the above teaching. It is intended that the scope of the invention and all equivalents be defined by the claims appended hereto.

The invention claimed is:

1. A location trackable power cord, comprising:
a hospital grade power cord including a sheath and a plurality of conductors therein;
a location tracking module housing having blades extending therefrom;
said power cord having a first end and a second end, one of said first end or said second end disposed in said location tracking module housing and in electrical communication with said blades;
said plurality of conductors extending between a plug at the other of said first end or said second end;
a circuit board, a location tracking module, a power supply and a battery also disposed within said location tracking module housing; and
said plurality of conductors in electrical communication with said battery and said location tracking module.

2. The location trackable power cord of claim 1, said one of said first end or said second end being 120V AC input.

3. The location trackable power cord of claim 2, the other of said first end or said second end being 120V AC output.

4. The location trackable power cord of claim 1, said plurality of conductors being three conductors.

5. The location trackable power cord of claim 1 wherein said location tracking module utilizes at least one of triangulation or trilateration to determine position.

6. The location trackable power cord of claim 1, further comprising said power supply that includes an AC to DC transformer.

7. The location trackable power cord of claim 6, said transformer being in electrical communication with said battery.

8. The location trackable power cord of claim 7, said battery being a rechargeable battery.

9. The location trackable power cord of claim 8, said battery being a lithium ion battery.

10. The location trackable power cord of claim 1, said blades at said location tracking module housing having three prongs.

11. The location trackable power cord of claim 1, said plug at the other of said first end or said second end being a female plug having three apertures.

12. The location trackable power cord of claim 1, wherein the location tracking module may further comprise a GPS satellite receiver.

13. The location trackable power cord of claim 12, further comprising a digital cellular transceiver.

14. The location trackable power cord of claim 12, further comprising an analog cellular transceiver.

15. The location trackable power cord of claim 12, further comprising a wireless communication module.

16. The location trackable power cord of claim 15, said wireless communication module including a Wi-Fi communication module.

17. The location trackable power cord of claim 11, said one of said plugs being one of straight or right angle type.

18. The location trackable power cord of claim 1, one of said plugs being located on said location tracking module housing.

19. A system for tracking a medical device, comprising:
a hospital grade power cord having a first plug, said power cord connectable to a medical device at an end, said power cord including conductors therein;
a housing connected to said power cord, said housing having a global positioning system ("GPS") circuit board therein, said housing having blades extending therefrom;
a power supply in said housing in electrical communication with said conductors;
said power supply connected to said GPS circuit board and to a battery charging circuit;
a communication module in communication with said GPS circuit board, said communication module including a GPS satellite receiver and at least one of a cellular transceiver or a Wi-Fi transceiver;
a GPS server in communication with said power cord and accessible by computer to determine location of said medical device.

20. The system of claim 19, further comprising a ground plug extending from said housing.

21. A location trackable power cord, comprising:
a hospital grade power cord including a sheath and a plurality of conductors therein;
said sheath extending from a location tracking module housing;
a plurality of blades extending from said location module housing, said conductors in electrical communication with said blades and a plug at an opposite end of said power cord spaced from said location module housing;

a circuit board, a location tracking module, a power supply and a battery also disposed within said location tracking module housing; and said plurality of conductors in electrical communication with said battery and said location tracking module.

* * * * *